(12) United States Patent
Vietsch

(10) Patent No.: US 9,261,424 B2
(45) Date of Patent: Feb. 16, 2016

(54) METHOD OF ASSESSING SHAFT ALIGNMENT BASED ON ENERGY EFFICIENCY

(75) Inventor: Jan Willem Karel Vietsch, Nieuwegein (NL)

(73) Assignee: AKTIEBOLAGET SKF, Gothenburg (SE)

( * ) Notice: Subject to any disclaimer, the term of this patent is extended or adjusted under 35 U.S.C. 154(b) by 246 days.

(21) Appl. No.: 13/997,326

(22) PCT Filed: Dec. 22, 2011

(86) PCT No.: PCT/EP2011/073841
§ 371 (c)(1),
(2), (4) Date: Oct. 16, 2013

(87) PCT Pub. No.: WO2012/085231
PCT Pub. Date: Jun. 28, 2012

(65) Prior Publication Data
US 2014/0028298 A1 Jan. 30, 2014

Related U.S. Application Data

(63) Continuation of application No. 13/331,368, filed on Dec. 20, 2011, now Pat. No. 8,996,142.

(60) Provisional application No. 61/426,089, filed on Dec. 22, 2010.

(51) Int. Cl.
*G01B 7/30* (2006.01)
*G01L 5/24* (2006.01)
(Continued)

(52) U.S. Cl.
CPC . *G01L 5/24* (2013.01); *F02B 61/00* (2013.01); *G01B 7/312* (2013.01); *G01B 21/24* (2013.01); *G05D 17/02* (2013.01); *B60L 1/00* (2013.01); *B60L 2210/00* (2013.01)

(58) Field of Classification Search
CPC ....... F02B 61/00; B60L 1/00; B60L 2200/00; B60L 2210/00
See application file for complete search history.

(56) References Cited

U.S. PATENT DOCUMENTS

| 5,526,282 A | 6/1996 | Nower et al. |
| 5,621,655 A | 4/1997 | Nower et al. |

(Continued)

FOREIGN PATENT DOCUMENTS

WO    0203029 A1    1/2002

OTHER PUBLICATIONS

Gaberson H.A, "Rotating machinery energy loss due to misalignment," Energy Conversion Engineering Conference, Aug. 11, 1996, 1809-1812, vol. 3, Proceedings of the 31st Intersociety Washington, DC, USA.

(Continued)

*Primary Examiner* — Huy Q Phan
*Assistant Examiner* — Temilade Rhodes-Vivour
(74) *Attorney, Agent, or Firm* — Bryan Peckjian; SKF USA Inc. Patent Dept.

(57) ABSTRACT

A method of determining and utilizing an Energy Efficiency Indicator, the method initiating with a step of determining a distal or angular offset between a pair of coupled shafts provided between adjacent rotating machines. The offset is correlated to energy efficiency between the pair of coupled shafts. Correlation is referred to as an Energy Efficiency Indicator (EEI). The Energy Efficiency Indicator (EEI) can be used to predict changes in alignment, changes in energy efficiency, and the like. Monitoring the coupled rotating machines and using the Energy Efficiency Indicator (EEI) can provide the operator with predictive information to enhance the reliability and extend the lifespan of the coupled rotating machines.

19 Claims, 13 Drawing Sheets

(51) Int. Cl.
*F02B 61/00* (2006.01)
*G01B 21/24* (2006.01)
*G01B 7/312* (2006.01)
*G05D 17/02* (2006.01)
*B60L 1/00* (2006.01)

(56) References Cited

U.S. PATENT DOCUMENTS

| | | | | |
|---|---|---|---|---|
| 5,907,191 | A * | 5/1999 | Sasaki et al. | 290/19 |
| 5,922,977 | A | 7/1999 | Evans et al. | |
| 8,668,613 | B1 * | 3/2014 | Stevens | F16H 3/04 475/162 |
| 2002/0079859 | A1 * | 6/2002 | Lumsden | 318/727 |
| 2006/0070469 | A1 * | 4/2006 | Lester | F16H 29/02 74/125.5 |
| 2006/0290304 | A1 * | 12/2006 | Marcinkiewicz et al. | 318/432 |
| 2007/0034428 | A1 * | 2/2007 | Janson | B60K 6/365 180/65.235 |

OTHER PUBLICATIONS

Veale K.L. et al, "Efficiency management within an industrial environment," Industrial Engineering and Engineering Management (IE &EM), Sep. 3, 2011, 1859-1863, 2011 IEEE 18th International Conference on, IEEE.

* cited by examiner

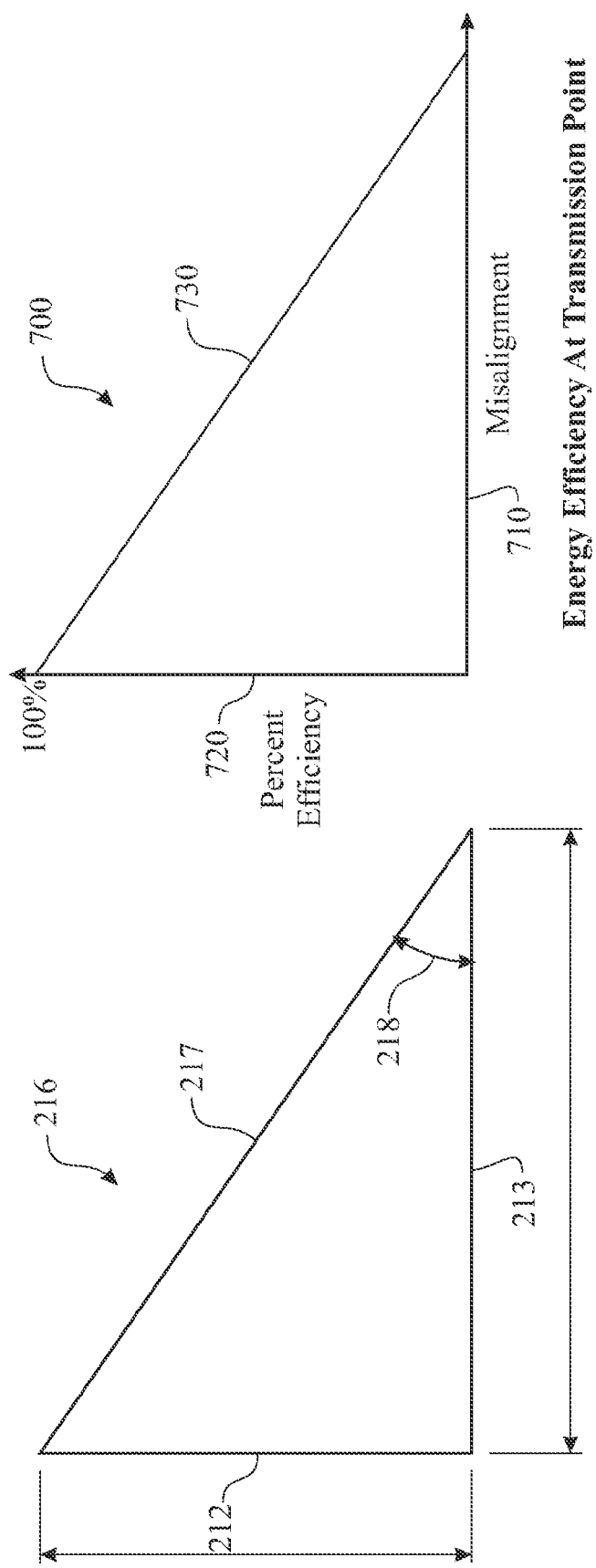

METHOD OF ASSESSING SHAFT ALIGNMENT BASED ON ENERGY EFFICIENCY

CROSS-REFERENCE TO RELATED APPLICATIONS

This application is a National Stage Patent Application claiming the benefit of International Application Number PCT/EP2011/073841 filed on 22 Dec. 2011, which priority to U.S. Non-Provisional application Ser. No. 13/331,368 filed on Dec. 20, 2011, and U.S. Provisional Patent Application Ser. No. 61/426,089, filed on Dec. 22, 2010, which are incorporated herein in their entireties by reference.

BACKGROUND OF THE INVENTION

1. Technical Field of the Invention

The present invention relates to a process of aligning and retaining alignment of a series of rotating equipment coupled together for cooperative operation. More specifically, the observation, recordation, and utilization of various characteristics of the equipment, equipment set up, and operational characteristics to predict, optimize, and retain alignment therebetween.

2. Background Art

Rotating machinery, equipment, or other devices can be provided in many form factors, such as an electrical motor, a combustion motor, a pump, a transmission or other gear box, and the like. Rotating equipment is commonly configured coupling at least two rotating devices together, referred to as a machine train. The configuration can couple two or more like devices together, such as motors, pumps, and the like to provide serial addition of power or parallel functionality, respectively. Alternatively, the configuration can couple two or more dissimilar devices together, such as coupling a motor and a transmission, coupling a motor and a pump, and the like to provide joint functionality. In any configuration, alignment between two adjacent components impacts the efficiency and reliability of the equipment.

Many factors can impact alignment between equipment. Alignment of the equipment dictates that the equipment remains stationary, and thus the alignment process is completed when the equipment is completion in a non-operational state. Additionally, the alignment process is commonly completed in an ambient environment. Unfortunately, this requirement removes a number of variables, which impact the alignment during operation, where those variables are only present during operation. Examples include thermal effects on each element of the equipment, balance of rotating elements, changes in compressive components such as soft feet, changes due to torsional effects, and the like. The operational environment commonly changes in temperature, which affects the mounting area, the equipment, and the like. In most operational scenarios, the equipment and operating environment increases in temperature, impacting the alignment between adjacent equipment.

Each individual machine arrangement is different resulting from each arrangements unique characteristics. Even identical sets of machinery can dictate different terms for alignment. Factors of each configuration including location, mounting schematics, and the like affect the alignment.

Laser alignment was introduced in the 1980's. This process utilized one or more diode lasers and detectors (PSD's). The PSD's were able to detect fairly accurately (within 10 µm's) relative positioning between two adjacent shafts. Information is provided to the service person through a display unit. The system determines what information needs to be conveyed to the service person in order to direct the service person on what is required to optimize alignment between two adjacent components. The display unit can be provided in any of many known form factors, including a computer, preferably comprising a wireless interface. Software converts the detector signals into a set of instructions in an understandable format for the operator or service person. Alignment or registration between two adjacent components is commonly defined in two components:

A. Angular misalignment

B. Parallel or offset misalignment

Parallel registration can be defined in two directions, horizontal and vertical, basically referring to respectively X-axis and Y-axis.

Another component that could be considered is end-to-end registration, ensuring sufficient gap is provided for thermal expansion, vibration, and the like.

The fundamental setup of the laser alignment instrumentation has remained unchanged since its inception in the 1980's, including a diode laser based system with a detector and a portable computer with standard alignment software.

As technology has evolved, the technological advances have been integrated into the process. Examples include the introduction of wireless technology changed the method of data transfer from the laser/detector to the portable computer, by removing cables previously connecting therebetween. Although technology has advanced and aided the user in certain areas, the overall fundamentals of the process, including the hardware and respective software have remained unchanged over the years.

Most craftspeople that align machinery already understand the phenomenon of what is usually called machinery "soft foot." Soft Foot is a common term used for machine frame distortion. The distortion is caused when one or more feet of a machine differ in height from the others. This in turn may be due to differences when the machine was manufactured, a squishy footage with oil film etc. between foot and base, a bent foot, or it may be induced by a pipe to which the machine is attached (e.g. a pipe on top of a pump), which prevents the machine from touching all its feet to its base.

As many vibration specialists have never actually aligned machinery, they may have heard of "soft feet" but may not always understand the result in vibration. Soft feet can cause increased vibration amplitudes. Although "soft feet" does not necessarily magnify machine vibration, it should be reduced for many reasons, including preventing vibration magnification.

The current alignment process includes the following steps:

A. Position alignment equipment as directed for aligning two adjacent rotating machines;

B. Measure the soft foot;

C. Correct the soft foot;

D. Measure the current alignment;

E. Enter a tolerance into the software, wherein the tolerance may be a target;

F. Correct any misalignment between two adjacent rotating machines until the alignment is within the established tolerance or target; and G. Record the measurements, such as entering the measurements into an electronic database and optionally uploading the information to a remote database.

It is well know that unless soft foot conditions are checked, alignment may be impossible or the improvement in alignment may be short-lived.

The current alignment process is dependent upon the experience level of the alignment engineer. Most experienced alignment engineers are disappearing. Each configuration between adjacent rotating machines is different, thus being unique in alignment. The level of experience of the alignment engineer impacts the time and quality of the alignment. Lack of knowledge respective to the details is only a portion of the problem. The lack of awareness that results in not searching for the answer contributes to the problem. Another contributing factor is when the alignment engineer fails to apply the correct details, which is certainly a problem.

Long term reliability of the trained rotating machinery is dependent upon a sustained alignment. Misaligned shafts which are coupled together can cause inefficient transfer of energy or torque from a drive shaft to a torque receiving shaft. Misalignment can cause premature wear and failure of components, seal damage which allows leaks of lubricants and other fluids, and the like. Premature wear and failure can result in excessive downtime, higher operating costs, and the like.

Thus, what is desired is a process to identify when the alignment between coupled shafts of adjacent rotating machines shifts where the alignment is no longer within an acceptable tolerance range.

DISCLOSURE OF THE INVENTION

The present invention is directed to a method of determining an Energy Efficiency Indicator respective to a coupling provided between two adjacent rotating machines.

In a first aspect of the present invention, a method of determining an Energy Efficiency Indicator respective to a coupling provided between two adjacent rotating machines comprising steps of:

obtaining a computing device comprising a microprocessor, a digital data storage device, a user input interface enabling an alignment engineer to enter data, a display for providing information to the alignment engineer, circuitry providing operable interconnectivity between components, an instruction set provided in a form of an energy efficiency indicator software program, and respective power to operate the computing device;

determining an offset between a pair of coupled shafts of adjacently located rotating machinery;

entering the coupled shaft offset into an energy efficiency indicator software program; and calculating a percent energy loss utilizing the coupled shaft offset in conjunction with at least one of an algorithm and an index table.

A second aspect of the present invention, a method of determining an Energy Efficiency Indicator respective to a coupling provided between two adjacent rotating machines comprising steps of:

obtaining a computing device comprising a microprocessor, a digital data storage device, a user input interface enabling an alignment engineer to enter data, a display for providing information to the alignment engineer, circuitry providing operable interconnectivity between components, an instruction set provided in a form of an energy efficiency indicator software program, and respective power to operate the computing device;

determining an offset between a pair of coupled shafts of adjacently located rotating machinery;

entering the coupled shaft offset into an energy efficiency indicator software program;

determining a drive torque generated by a power providing shaft of the pair of coupled shafts;

entering the drive torque into an energy efficiency indicator software program;

determining a transferred torque generated by a power providing shaft of the pair of coupled shafts;

entering the transferred torque into an energy efficiency indicator software program;

calculating an energy efficiency by dividing the transferred torque by the drive torque; and creating a correlation between the energy efficiency and the coupled shaft offset.

These and other features, aspects, and advantages of the invention will be further understood and appreciated by those skilled in the art by reference to the following written specification, claims and appended drawings, which follow.

BRIEF DESCRIPTION OF THE DRAWINGS

For a fuller understanding of the nature of the present invention, reference should be made to the accompanying drawings in which:

FIG. 10 presents an exemplary geometric representation of a resultant offset between two coupled shafts of the pair of adjacent rotating machines;

FIG. 11 presents a representative graph illustrating a relationship between a percent efficiency and shaft misalignment;

Like reference numerals refer to like parts throughout the several views of the drawings.

MODES FOR CARRYING OUT THE INVENTION

Figure 1:
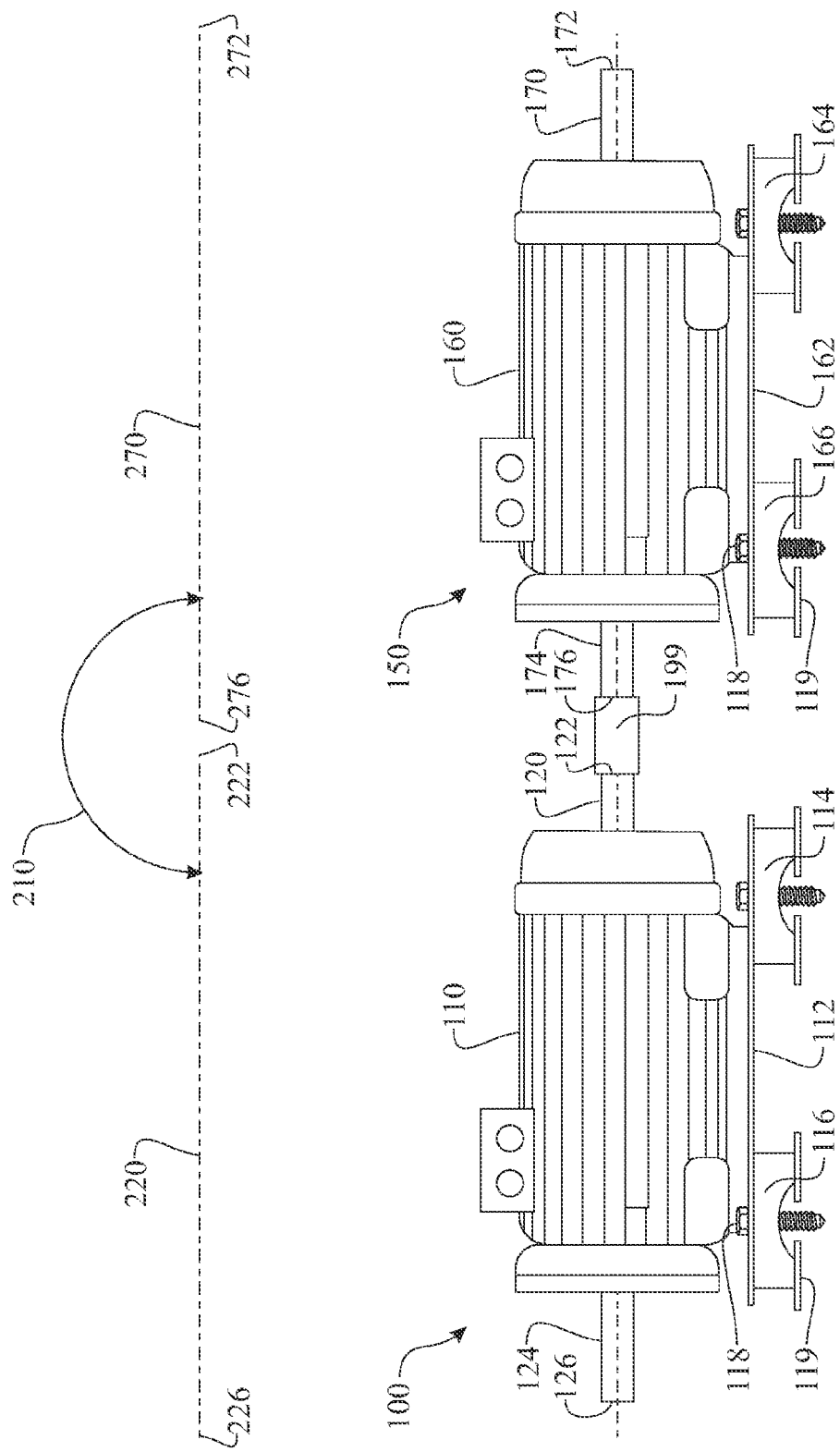
FIG. 1 presents an elevation view of an exemplary pair of adjacent rotating machines illustrated in desired alignment.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Rotating machinery commonly involves coupling adjacent machines together for operation as illustrated in FIGS. 1 through 6. Misalignment between adjacent rotating machines can impact the configuration in a variety of ways, including premature failure. The following are examples of the impact of premature failure caused by misaligned machinery:

Increased frequency of replacing parts, such as bearings, couplings, seals, and the like, which result in additional operational costs including replacement parts and labor;

Increased logistic costs, including materials procurement, inventory holding costs, materials management costs, and the like;

Increased frequency of interventions, including man hours, materials, tools, transportation, and the like, and thus adding associated intervention costs to the overall operating budget; and where applicable, impacts from resultant downtime of the machinery, including reduction in productivity, reduced labor efficiencies (revenue per labor cost), reduced real estate efficiency (revenue per area of real estate), lost revenue, and the like.

Alignment of the rotating machinery is accomplished while the machinery is in a non-operational state. The alignment process considers any relation between two adjacent pieces of rotating machines. The term machine can refer to any device comprising a rotating mechanism, and should be considered synonymous with machine, equipment, device, apparatus, and the like.

In the exemplary embodiment, a mounted first rotating machine assembly 100 is located adjacent to a mounted second rotating machine assembly 150. The exemplary mounted first rotating machine assembly 100 and mounted second rotating machine assembly 150 are motors, wherein it can be appreciated by those skilled in the art that the mounted first rotating machine assembly 100 and mounted second rotating machine assembly 150 are only exemplary and could include any rotating machinery, including electrically operated motors, combustion motors, transmissions, pumps, and the like.

The mounted first rotating machine assembly 100 and mounted second rotating machine assembly 150 are mounted upon a surface by a series of mounting feet 112, 114, 162, 164. The mounting feet 112, 114, 162, 164 enable adjustments for alignment, absorb vibrational energy, and support the mounted rotating machine assemblies 100, 150. Each rotating machine assembly 100, 150 includes a rotating shaft. The rotating shaft can extend outward from one or both ends of the rotating machine assembly 100, 150. The exemplary embodiment includes a rotating shaft having an end extending from each end of the rotating machine assembly 100; the respective shaft being described as including a first shaft portion 120 extending from a first end of the first rotating machine 110 and a second shaft portion 124 extending from a second, opposite end of the first rotating machine 110, which terminates at a second shaft portion coupling end 126. Similarly the exemplary rotating machine assembly 150 comprises a rotating shaft having an end extending from each end thereof; the respective shaft being described as including a first shaft portion 170 extending from a first end of the second rotating machine 160, which terminates at a second shaft portion coupling end 172 and a second shaft portion 174 extending from a second, opposite end of the second rotating machine 160.

Each rotating machine 110, 160 includes a rotating machine base 112, 162. A series of feet 114, 116, 164, 166 are attached to each rotating machine base 112, 162, respectively. The feet 114, 116, 164, 166 are generally secured to a supporting surface by a series of threaded mounting fasteners 118. Alignment shims 119 can be inserted as deemed necessary to aid in alignment between abutting shaft ends, such as the first shaft portion 120 and second shaft portion 174 shown in the exemplary illustrations.

Considering the fact that there is no revolutionary change in technology that could be applied in the hardware the software side has significant potential.

Over the number of years, the software has been developing into a "mature" stage where basically all alignment situations or applications are covered. Examples include: normal shaft alignment, cardan shaft alignment, spacer shaft alignment, soft foot measurement using laser/sensor.

The software could hold the "anticipated alignment values" in different formats. Alignment Targets (anticipated alignment values) were calculated and expressed in different formats. For example, angular target per 100 mm or angular target as "gap" on coupling diameter or simply on the "feet" of the machine. In turbo-machinery it is quite common to use "reverse-rim" as a format to express the alignment target. There is only one problem there, if the specified target is expressed in one format and the software shows the results in another format it is very confusing to the operator to be able to judge whether the alignment values that were measured are correct, according the specified target.

Considering the example above, the software has a critical function in the process to bring clarity to the operator. The software should support the alignment engineer during the entire process of alignment and in every detail.

This philosophy requires a very accurate definition of the alignment process in terms of:

Scope, essentially what needs to be covered.

Detailed levels: it is noted that one missed/wrong detail could cause failure of the machine.

Sequence of the activities.

The present invention provides a process for aligning mating shaft portions of coupled machines 110, 160, more specifically, as presented in the exemplary illustration, the first shaft portion 120 of the first rotating machine 110 and the second shaft portion 174 of the second rotating machine 160. The first shaft portion 120 and second shaft portion 174 are coupled via an inter-machine coupler 199. Alignment between the first shaft portion 120 and second shaft portion 174 is critical to the operation and reliability of the system. Each of the FIGS. 1 through 6 include a portion of the illustration representative of the rotational axis of each of the shafts 120, 170, illustrated as a representative first shaft rotational axis 220 and a representative second shaft rotational axis 270. The ends of the representative first shaft rotational axis 220 are referenced as a representative first shaft coupling end 222 and a representative first shaft available end 226. Similarly, the ends of the representative second shaft rotational axis 270 are referenced as a representative second shaft coupling end 272 and a representative second shaft available end 276. The representative first shaft coupling end 222 and representative second shaft available end 276 are representative of the coupled section of the mating shaft portions, more specifically the first shaft portion 120 of the first rotating machine 110 and the second shaft portion 174 of the second rotating machine 160. The desired alignment positions the representative first shaft rotational axis 220 and representative second shaft rotational axis 270 in a parallel relation in both an elevation target alignment 210 (vertical registration) (FIG. 1) and a plan target alignment 211 (horizontal registration) (FIG. 4) during operation of the train of the rotation machine assemblies 100, 150.

Figure 2:
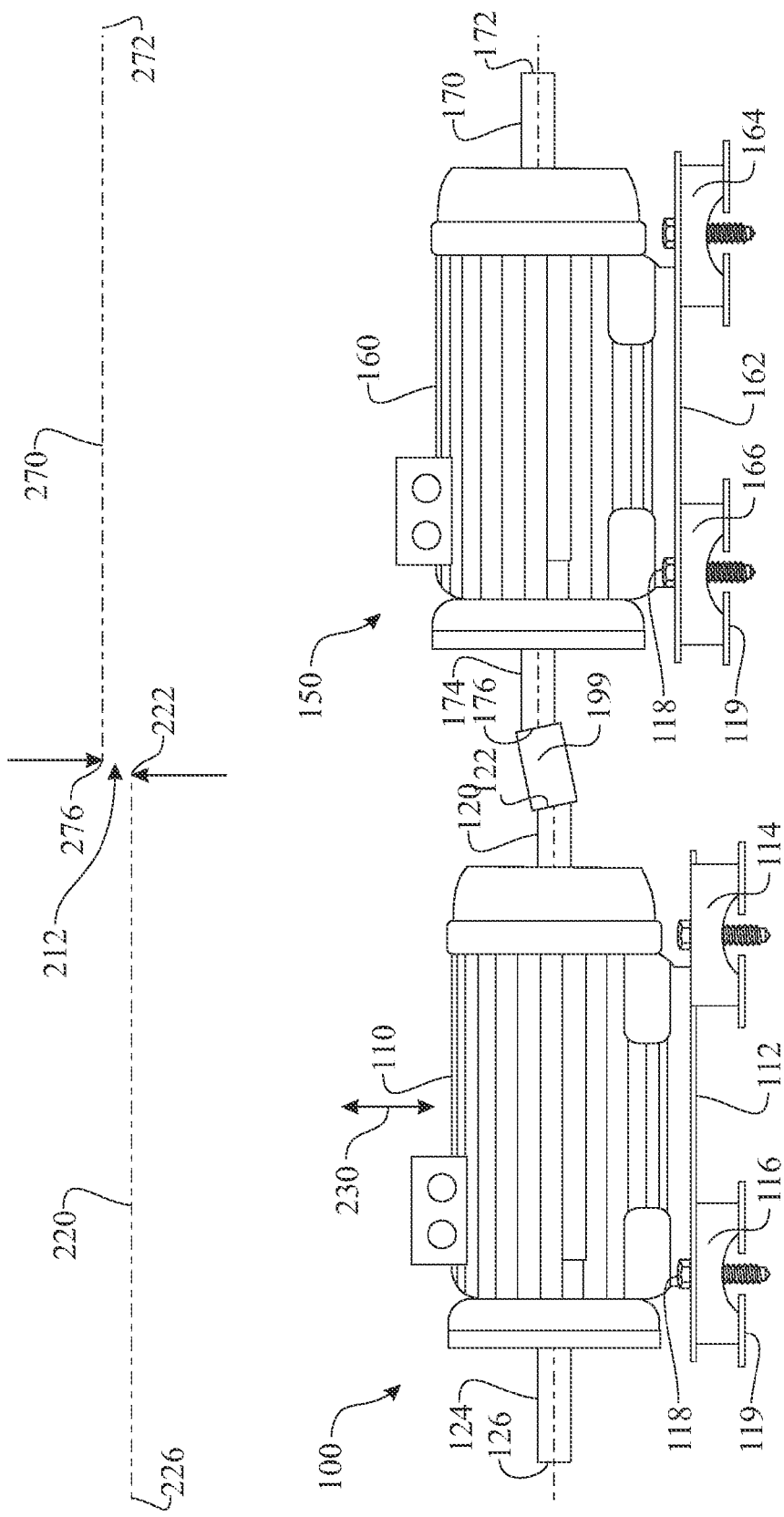
FIG. 2 presents an elevation view of the exemplary pair of adjacent rotating machines introduced in FIG. 1, the illustration demonstrating parallel misalignment therebetween in accordance with a vertical registration.
Figure 3:
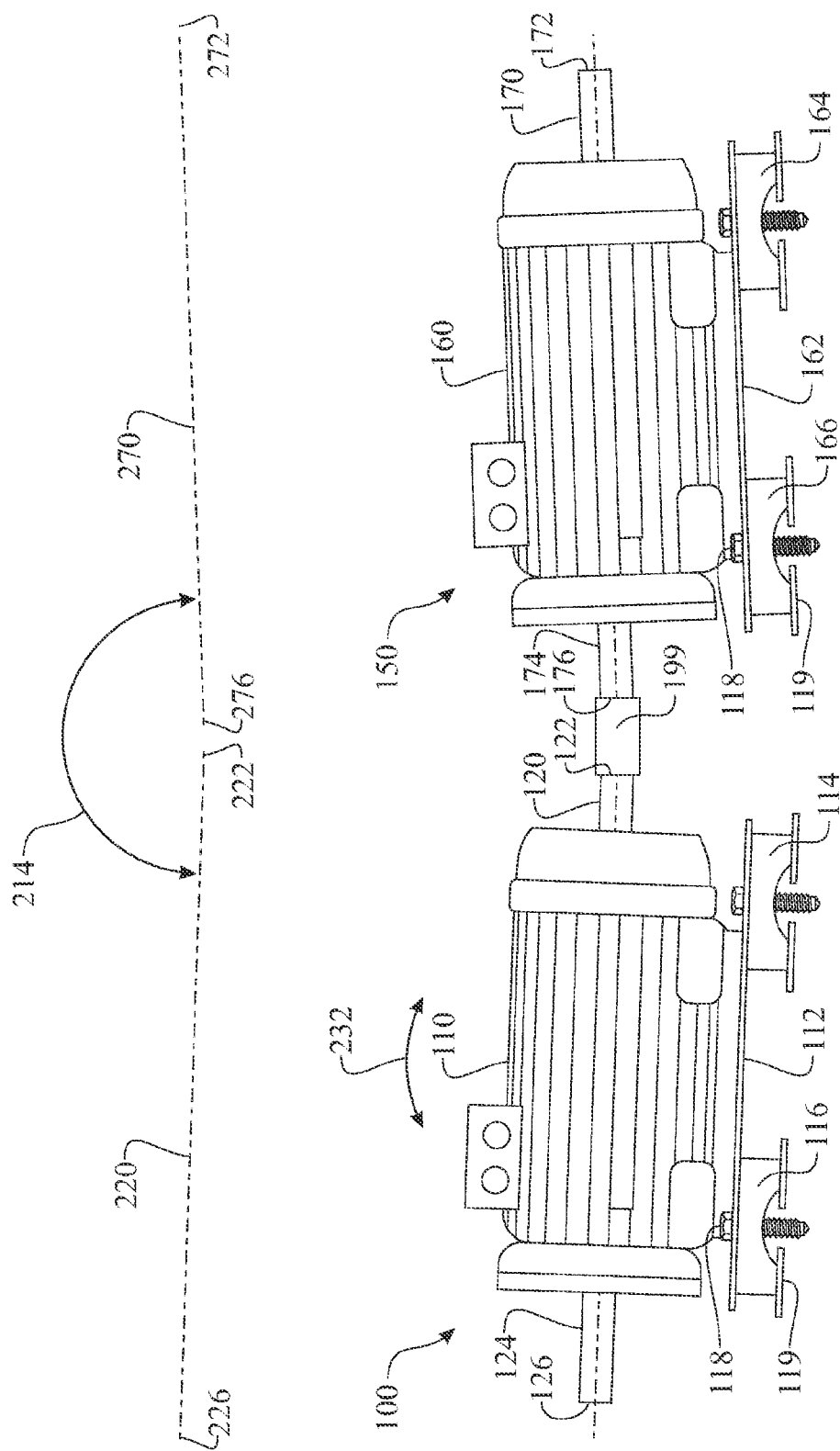
FIG. 3 presents an elevation view of the exemplary pair of adjacent rotating machines introduced in FIG. 1, the illustration demonstrating angular misalignment therebetween.
Figure 4:
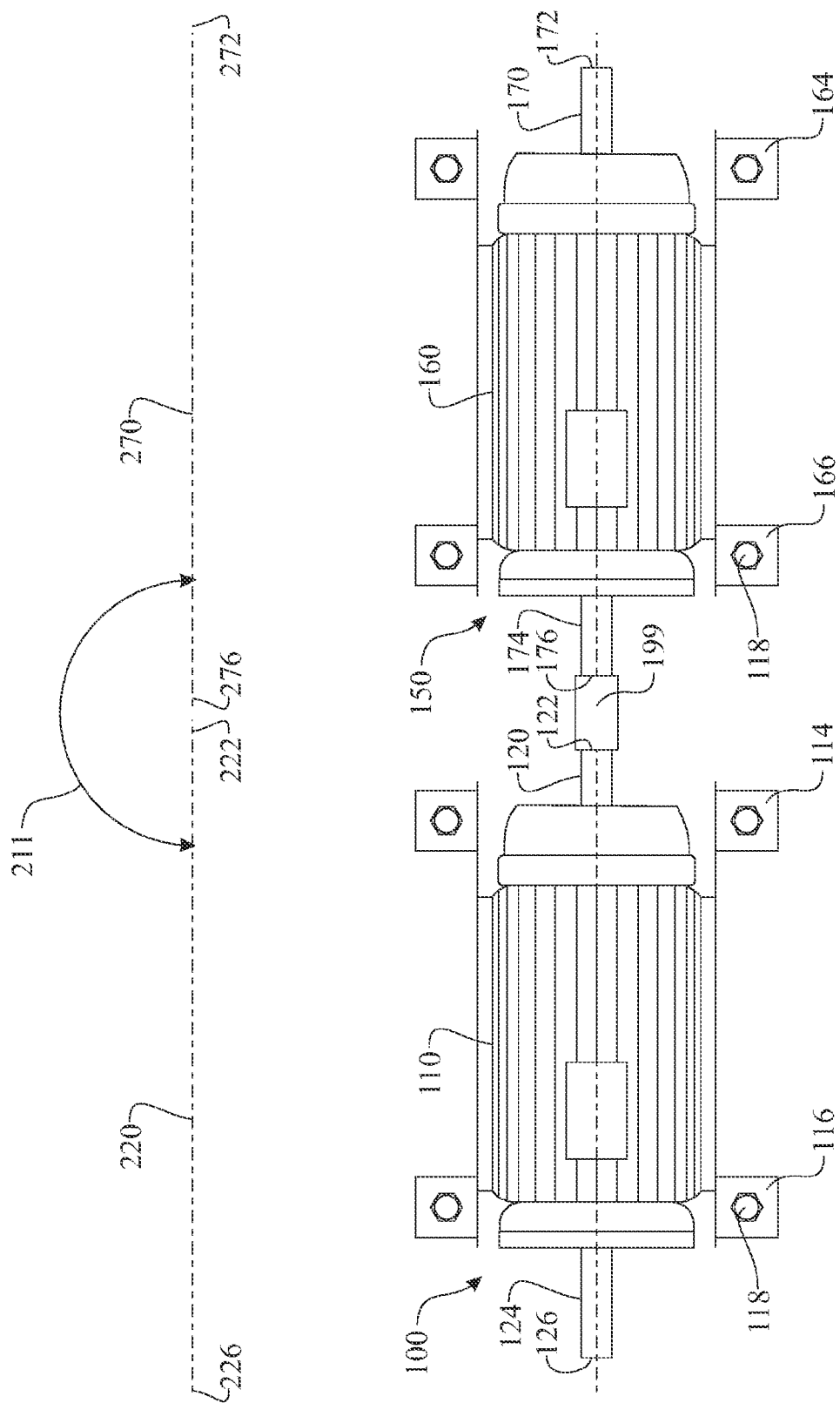
FIG. 4 presents a top view of the exemplary pair of adjacent rotating machines originally introduced in FIG. 1, the illustration demonstrating a desired alignment therebetween.
Figure 5:
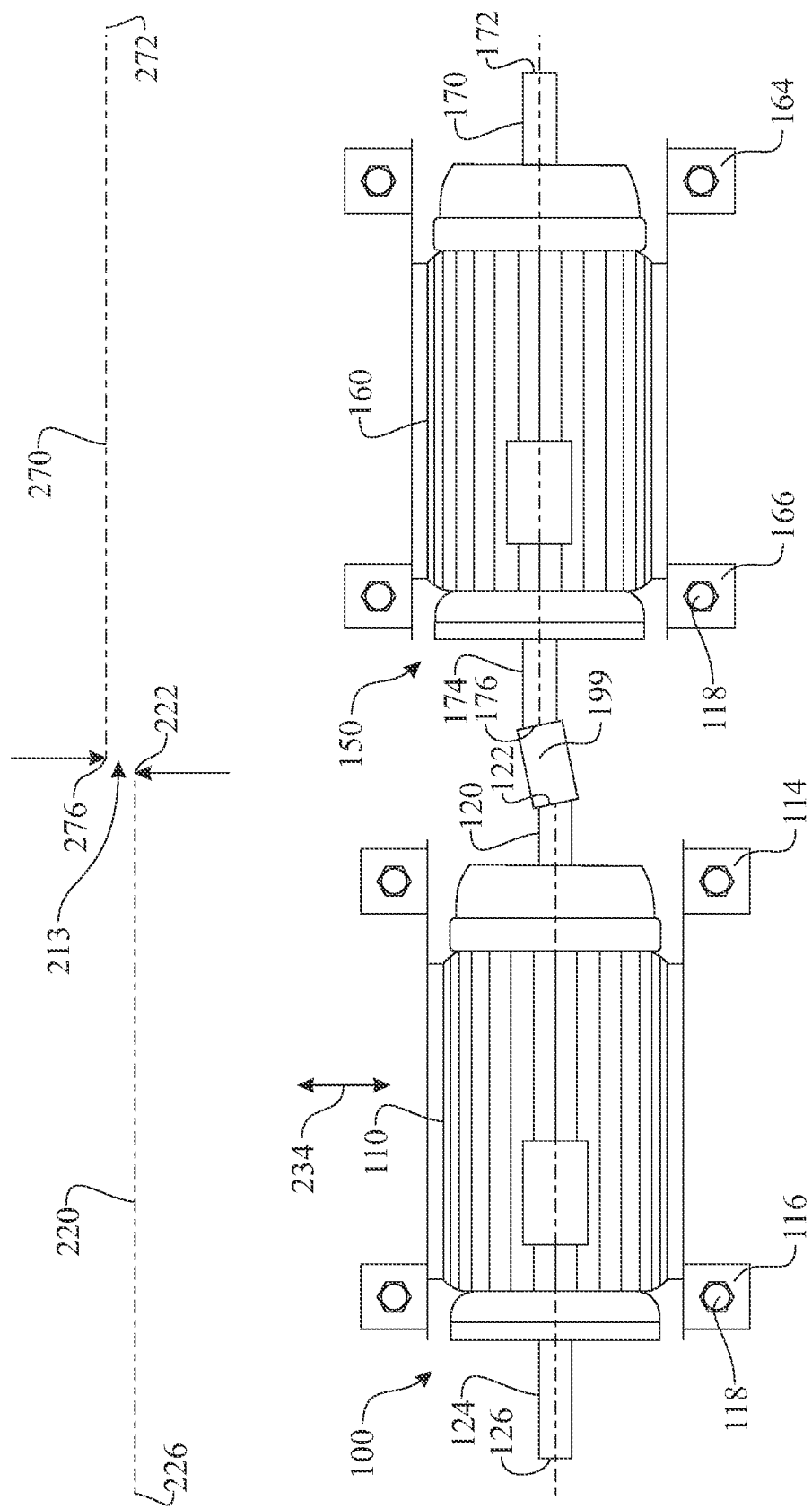
FIG. 5 presents a top view of the exemplary pair of adjacent rotating machines introduced in FIG. 4, the illustration demonstrating parallel misalignment therebetween in accordance with a horizontal registration.
Figure 6:
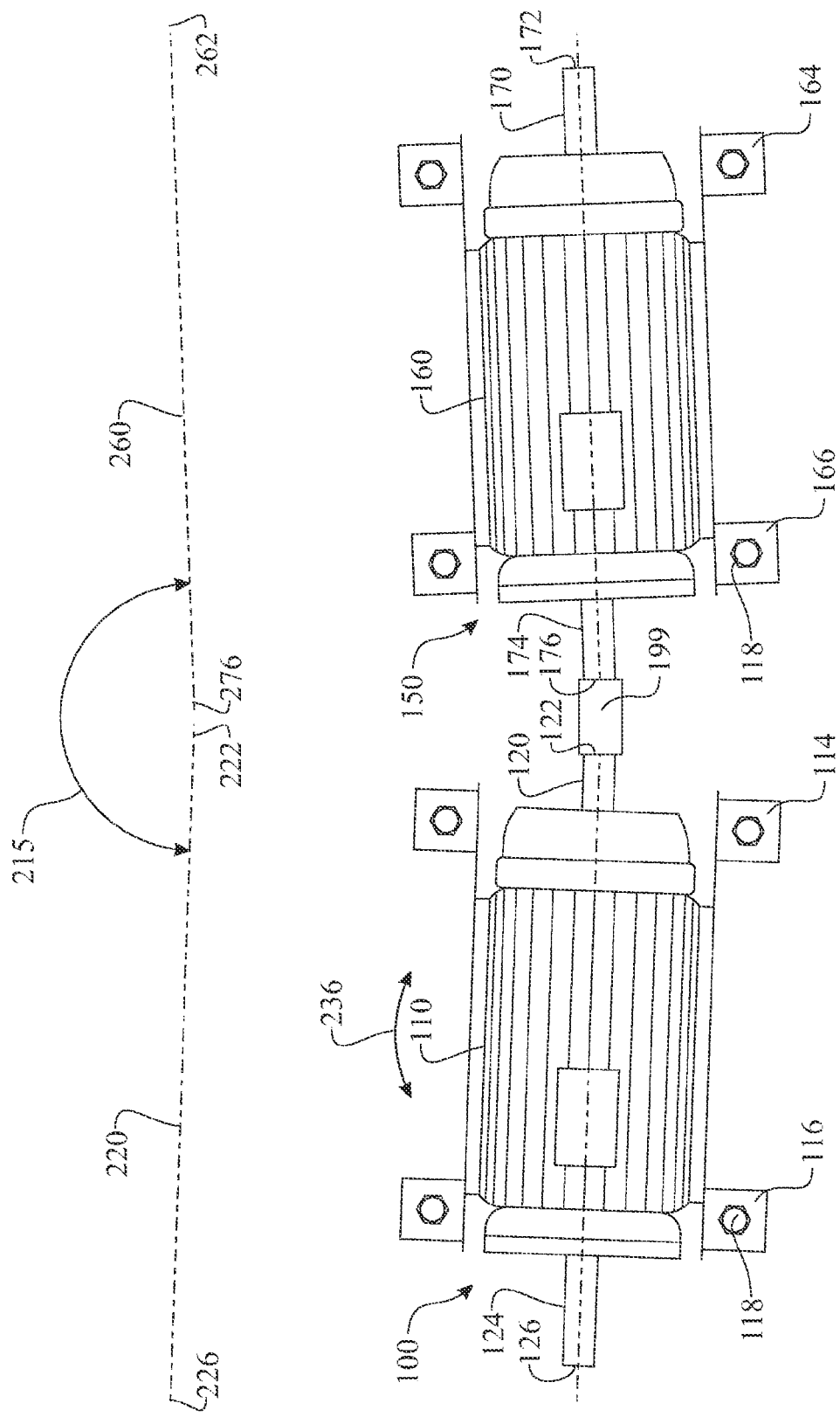
FIG. 6 presents a top view of the exemplary pair of adjacent rotating machines introduced in FIG. 4, the illustration demonstrating angular misalignment therebetween.

The alignment process utilizes alignment equipment, such as straight edges, dial gauges, shaft alignment lasers, and the like. The process is commonly supported by software, which provides step-by-step guidance to an alignment engineer through the process of aligning adjacent, coupled rotating machines 110, 160. The computer and respective software utilize data defining the initial alignment between the representative first shaft rotational axis 220 and representative second shaft rotational axis 270 to calculate and provide instructions to the alignment engineer, which direct the necessary adjustments. The computer includes a microprocessor, which is operated by a series of instructions provided by programming. Memory storage media is provided in data communication with the microprocessor. One or both rotating machine assemblies 100, 150 can be adjusted in accordance with a vertical adjustment 230 to compensate for a vertical offset 212 as illustrated in FIG. 2. One or both rotating machine assemblies 100, 150 can be adjusted in accordance with a horizontal adjustment 234 to compensate for a horizontal offset 213 as illustrated in FIG. 5. In addition to linear offsets, the rotating machine assemblies 100, 150 can be positioned having an angular offset, including an elevation angular offset 214, as demonstrated in the illustration presented in FIG. 3 and a plan angular offset 215, as demonstrated in the illustration presented in FIG. 6. One or both rotating machine assemblies 100, 150 can be adjusted in accordance with an elevation angular adjustment 232 to compensate for an elevation angular offset 214. Similarly, one or both rotating machine assemblies 100, 150 can be adjusted in accordance with a plan angular adjustment 236 to compensate for a plan angular offset 215. The methods of adjusting the linear relation and/or angular relation would be consistent with those known by those skilled in the art.

As previously mentioned alignment process is completed when the equipment is in a non-operational state, and preferably at an ambient temperature condition. One significant drawback of this process is that the alignment changes when the equipment is subjected to factors that only occur during operation. Examples of these are rotational torsion applied between the shafts, torsional forces applied to shaft bearings, thermal expansion of the various components, strain subjected to the mounting hardware 118 and feet 114, 116, 164, 166, and the like. Any misalignment during operation can affect uptime of the equipment 110, 160, long term reliability of the various components, efficiency of the system, and the like.

Figure 7:
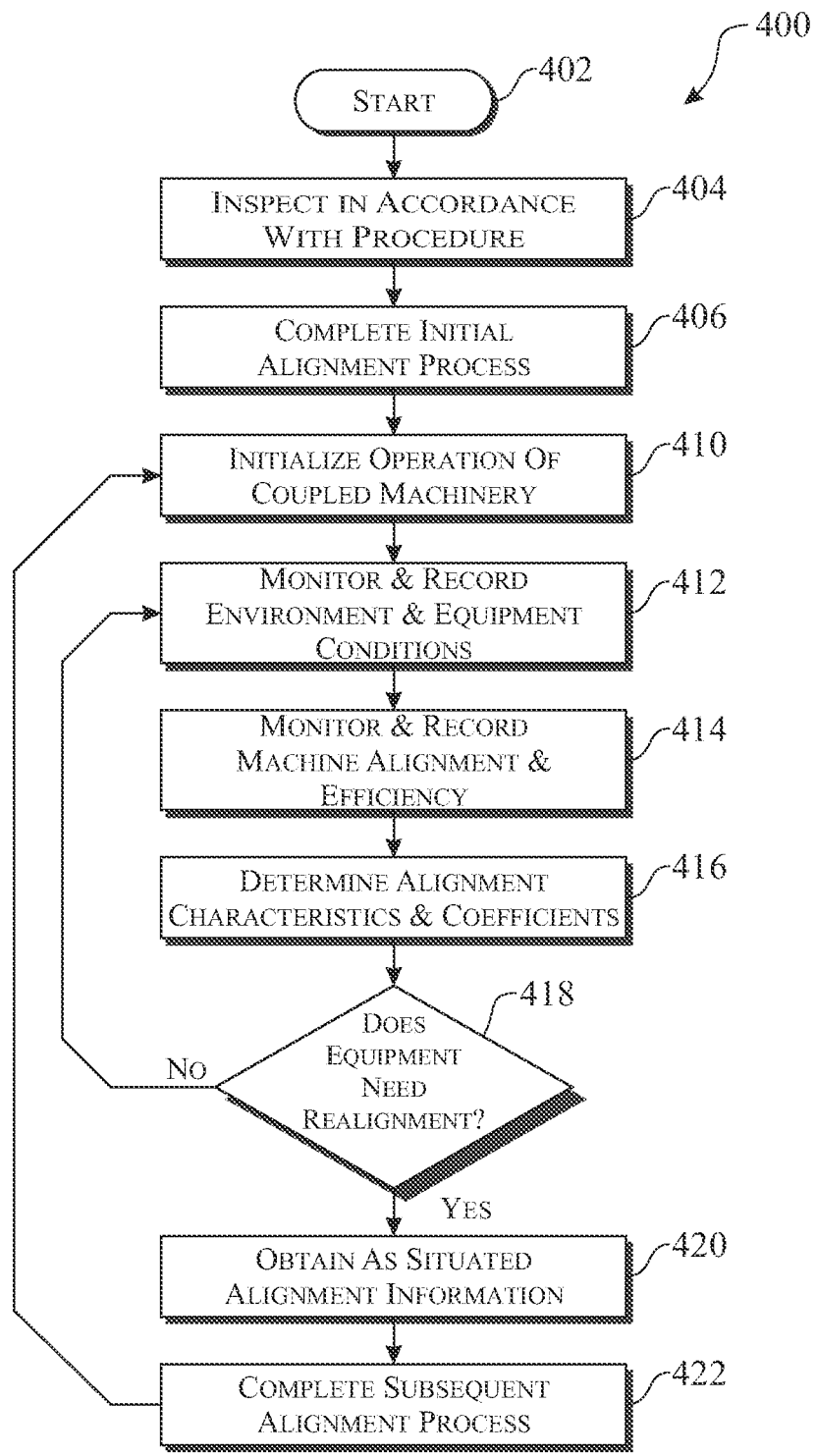
FIG. 7 presents an exemplary alignment overview block flow diagram.

The present invention provides an improved method of aligning the representative first shaft rotational axis 220 and representative second shaft rotational axis 270, where the alignment process determines optimal alignment of the machinery 110, 160 when the rotating machine assemblies, 110, 160 are in operation by using data previously obtained during operation. The improved or predictive alignment method is described in the exemplary rotating machinery predictive alignment process 400 presented in FIG. 7. Considering the current offering and the Gap the solution is to establish a structure (process) that is not only a predefined and static process, but a predefined dynamic process that can be adapted to each individual situation or setup of rotating equipment to be able to capture all details that are potentially a risk for premature failure. Although the arrangement can provided general information for similar configurations, the actual date would beset be suited specifically for the individual machine setup and would be used to optimize the sequence of the process where desirable. The process is considered to be dynamic, because it anticipates also to environmental changes that influence the result of the process.

Figure 8:
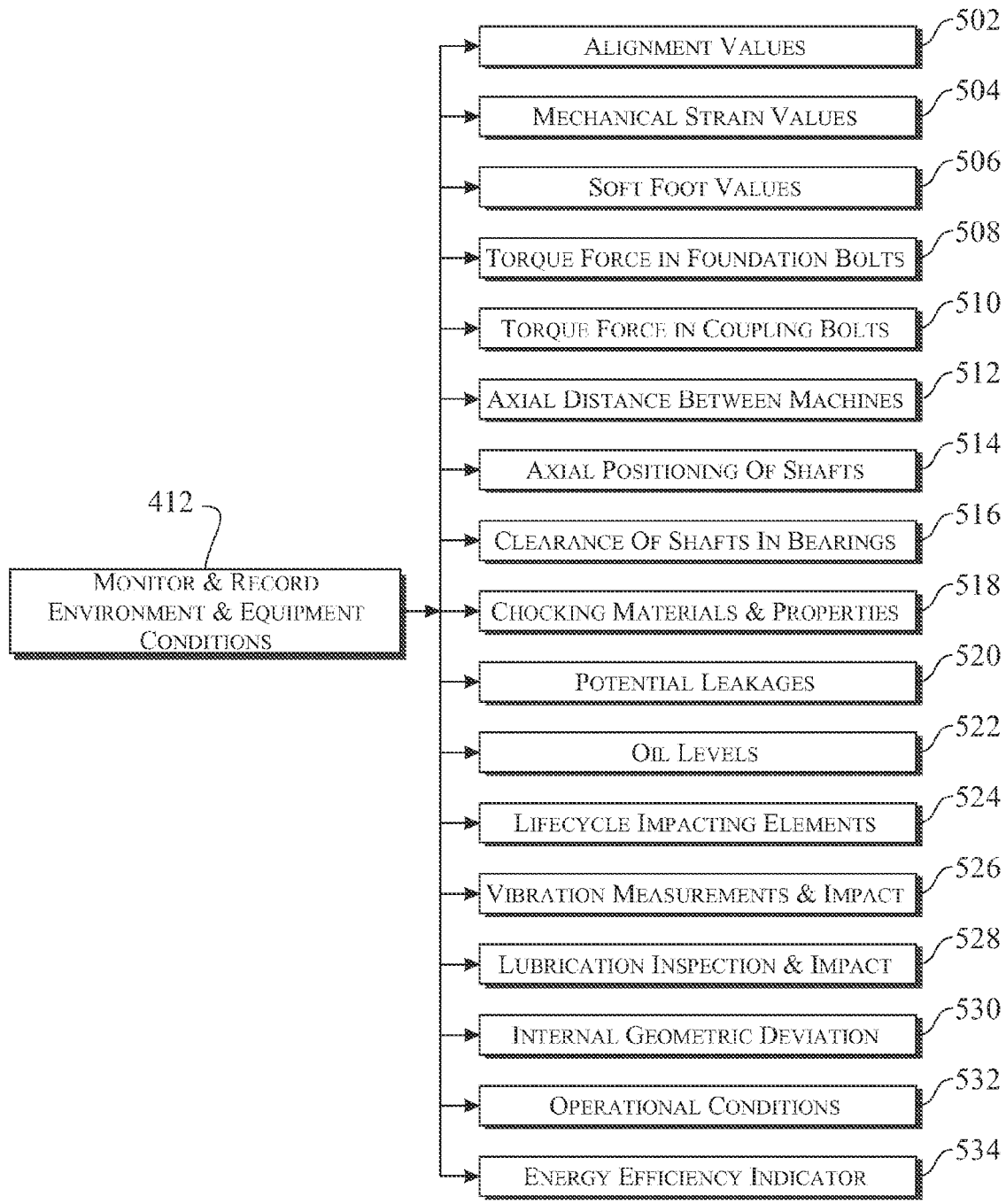
FIG. 8 presents an exemplary set of monitored conditions used for predicting and optimizing alignment between coupled machines.

The predictive alignment process initiates with a start step 402. The rotating machine assemblies, 110, 160 are inspected in accordance with a provided procedure (step 404). The alignment engineer determines if any operational correlation information is available. The alignment engineer proceeds in completing an initial alignment process between the two rotating machines 110, 160 as directed by instructions provided by the procedure (step 406). Operation of the equipment is then initiated (step 410). The mounted first rotating machine assembly 100 and mounted second rotating machine assembly 150 are preferably outfitted with various monitoring devices, which are placed in signal communication with a data recording device, such as a computer. The system would be monitored and the respective data would be recorded (step 412). The computer would include a data storage media, such as a magnetic media integrated into a hard drive, a non-volatile memory device such as a solid state data recording media, and the like. The signal communication interface can be provided by either cabling or a wireless communication protocol. A microprocessor can be integrated into the computer for deciphering the signal information, directing storage of the data, and correlating the information respective to the alignment status. Examples of the environment and equipment conditions that are monitored in accordance with step 412 are presented in FIG. 8 and will be subsequently described herein.

In parallel, the alignment monitoring system additionally monitors and records machine alignment and operational efficiency (step 414). The environment and equipment conditions data is correlated to the machine alignment and efficiency data to determine alignment characteristics and how the data can be utilized when aligning the system at an ambient, non-operation state to optimize alignment during operation (step 416). The system can optionally monitor the alignment, compare the actual alignment against acceptable or target data, and determine if the rotating machines 110, 160 need realignment (step 418). Alternatively, the rotating machines 110, 160 can be inspected to determine if the rotating machines 110, 160 need realignment (step 418). If the rotating machines 110, 160 do not need realignment, the process continued monitoring the assemblies 100, 150 and recording the respective data. If the rotating machines 110, 160 need realignment, the rotating machines 110, 160 are placed in a non-operational state and the alignment engineer obtains and utilizes the information gathered during operation (step 420) to correlate the alignment between the rotating machines 110, 160 to the required positional relationship therebetween, where the rotating machines 110, 160 are in optimal alignment during operation. The predictive alignment process utilizes the obtained data to determine predictive alignment values. Once the required positional relationship is calculated, the alignment engineer then completes the alignment process (step 422) in accordance with the predictive values.

The assemblies 100, 150 and respective environment can be monitored, as described in step 412 by any of many different factors. The data is preferably recorded locally and/or uploaded to a central database for reference at a later date. A series of exemplary factors are presented in FIG. 8, including:

Recording original alignment values as recited in step 502. This is preferably completed during or immediately following the alignment process.

Attaching strain gauges to predetermined components and/or locations on the assemblies 100, 150 to monitor mechanical strain values (step 504). Examples of the components and/or locations can include a housing of the rotating machine 110, 160; the rotating machine base 112, 162; the mounting feet 114, 116, 164, 166; the coupled portion of the shafts 120, 174; and the like. The strain gauges would be monitored either in a continuous manner or cyclical where data is recorded over spatial time intervals.

Attaching one or more monitoring devices to the mounting feet 114, 116, 164, 166 to determine or monitor soft foot conditions (step 506). The monitoring devices can measure acceleration (vibration), strain, deformation, and the like.

Monitor and record torque values of the threaded mounting fasteners 118 (step 508). This can be accomplished by manually or automatically measuring and recording the respective torque values for each threaded mounting fastener 118.

Monitor and record torque values of fasteners utilized within the inter-machine coupler 199 (step 510). This can be accomplished by manually or automatically measuring and recording the respective torque values for each fastener utilized by the inter-machine coupler 199.

Monitoring and recording the axial distance between the mounted first rotating machine assembly 100 and mounted second rotating machine assembly 150 (Step 512). This can include measurements between the first rotating machine 110 and second rotating machine 160, including the axial distance between the central locations of each machine 110, 160 to determine any change in axial distance therebetween, the axial distance between each respective edge to determine any angular change therebetween, and the like.

Monitoring and recording the axial distance between the first shaft portion 120 and first shaft portion 170 (Step 514). This can include measurements between the first shaft portion coupling end 122 and second shaft portion coupling end 176, including the axial distance therebetween; the horizontal offset therebetween, and the vertical offset therebetween. This can include a method of determine any off-balance scenario between each shaft first shaft portion 120 and first shaft portion 170.

Monitoring and recording the radial positioning and clearance of the shafts 120, 124, 170, 174 within the bearings (step 516).

Monitoring and recording the chocking materials and any changes in the respective properties (Step 518). This can include monitoring the thickness, nominal heights, deflections, dimensions, material grade, type/brand used, surface status, contact area, and the like.

Monitoring and recording the machinery system for any leakages that might occur at any seals or other potential area where leakages might occur (step 520).

Monitoring and recording the oil levels of the machinery system (step 522).

Monitoring and recording various elements for wear, lubrication, load, or any other element that could impact the lifecycle of the coupling including the inter-machine coupler 199, the first shaft portion coupling end 122, and the second shaft portion coupling end 176; the threaded mounting fasteners 118 and/or other fasteners; the chocking materials, the shafts 120, 170, the bearings, the seals, and the like (step 524).

Monitoring and recording any correlation between vibrational measurements and alignment related items (step 526).

Monitoring and recording any correlation between lubrication inspections or results of any related analysis and alignment related items (step 528).

Monitoring and recording any correlation between internal disturbance or deviation of geometry in rotating components and alignment related items (step 530).

Monitoring and recording any correlation between operational conditions and alignment scope activities, results, or analysis (step 532). This can include environmental temperature changes, equipment temperature changes, environmental pressure changes, environmental humidity changes, and the like.

Monitoring and recording any correlation between a transfer of power from a first shaft to a second shaft and the alignment of the coupled shafts of adjacent rotating machines (step 534).

Each of the monitored and recorded data points collected can be analyzed against alignment data obtained at the same point in time during operation. The alignment information obtained during operation can also be compared against alignment information when the rotating machines are in a non-operational condition. The analysis can provide coefficients, tables, or other correlating data that can be utilized to modify non-operational alignment information to calculate and provide predictive operational alignment information to the alignment engineer for use during the alignment process. The monitored and recorded data is preferably recorded and stored within a digital data storage media, such as a common magnetic hard drive, a solid state memory media, such as a non-volatile memory circuit, and the like. The information can be stored locally on a personal computer or remotely at an information data server.

The step of monitoring and recording environmental and equipment conditions 412 of the rotating machinery predictive alignment process 400 determines and records series of various types of data. The collected data and results of subsequent analysis of the data provide a predicted optimal alignment configuration for the rotational machinery system. As the volume of recorded data increases, the accuracy of the predicted optimal alignment configuration for the rotational machinery system also increases. The predicted optimal alignment configuration can be correlated to a non-operational configuration, enabling the alignment engineer to optimally align the rotating machines 110, 160 when the machines are in a non-operational state, while targeting optimal alignment when the rotating machines 110, 160 are in operation.

Figure 9:
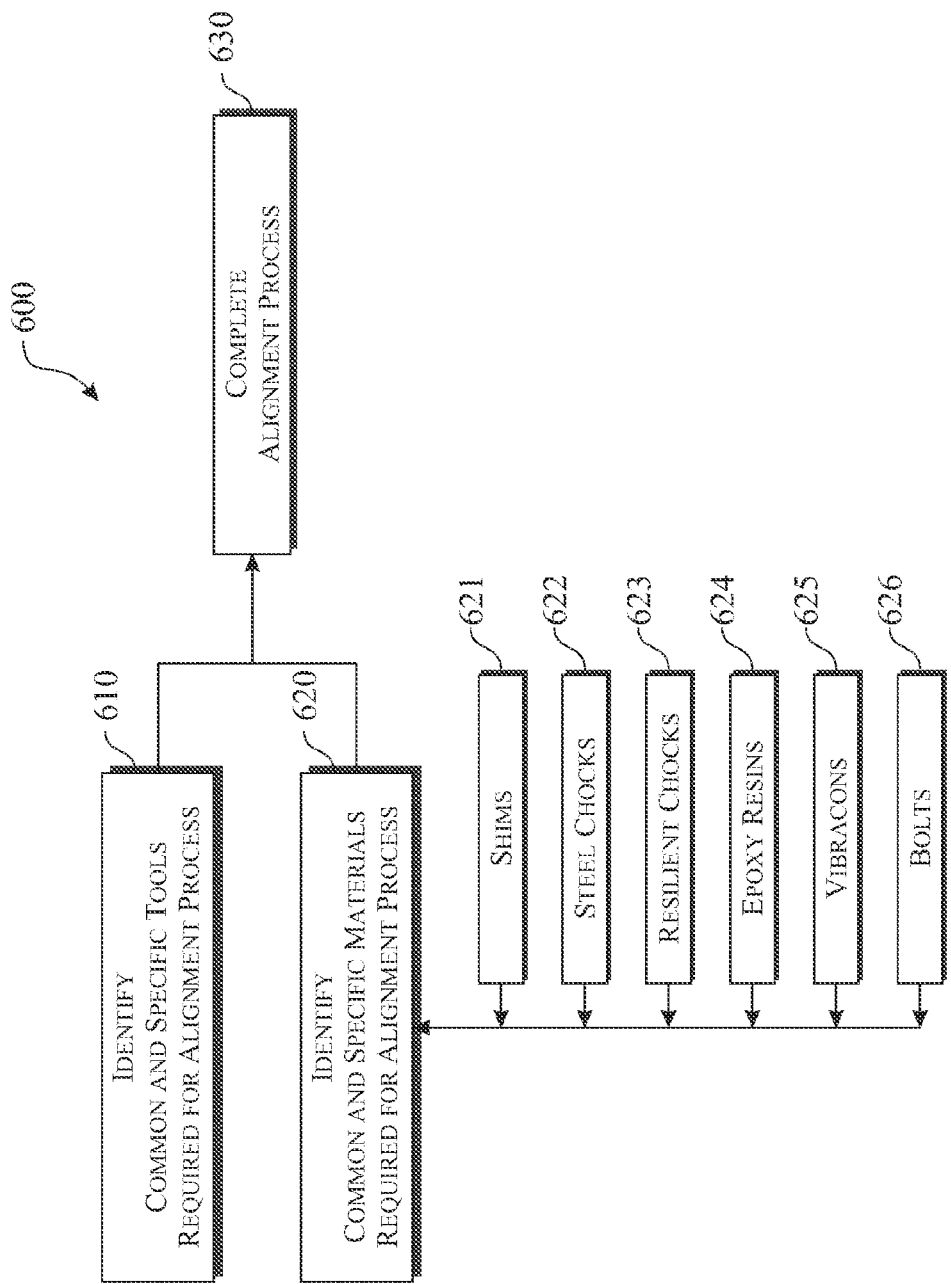
FIG. 9 presents an exemplary generic process for each individual machine.

The alignment engineer would prepare for execution of the predictive alignment process by following the preparation process flow 600 presented in FIG. 9. The alignment engineer refers to the alignment process procedure to initially identify common and specific tools required for the alignment process (step 610). These can include alignment tools (such as lasers, dial meters, and the like), sockets, wrenches, pliers, cantilevers, screwdrivers, star drive bits, wedges, torque wrenches, and the like. In addition to tools, the alignment engineer needs to obtain materials for execution of the alignment process. The procedure identifies the common and specific materials required for the alignment process (step 620). Several exemplary items that could be suggested for use during the alignment process (step 620) can include the following:

A plurality of shims (referenced by block 621), where the procedure would identify a series of shims having dimensions defined by a length, a width, and a thickness. The procedure may additionally include a specific material or several suggested materials.

A plurality of steel chocks (referenced by block 622), where the procedure would identify a series of shims having dimensions defined by a length, a width, and a thickness.

A plurality of resilient chocks (referenced by block 623), where the procedure would identify a series of properties, including a deflection specification, a limiter specification, a load height, a presetting value for alignment target (in both an initial installation configuration and in a settled configuration) min. and max height in all installed situations.

One or more epoxy resins (referenced by block 624): where the procedure would identify a series of properties, including: dimensions (length and width), nominal thickness, target hardness, net volume, gross volume, damming materials needed, temperature logging, checkpoints pollution, defined sprayed areas, static and dynamic loads and related max accepted limits table (manufacturer, classification societies), offset values for alignment targets and the like.

Vibracons (referenced by block 625): where the procedure would identify a series of properties, including: nominal height, min/max height, nominal, min/max load on the element, applied bolt and related torque, offset values for alignment targets, and the like.

Bolts (referenced by block 626): where the procedure would identify the properties, such as the grade and dimensions of the foundation bolts and other fastener hardware for each component. The dimensioning contains: M-size or UNC/UNF/WW with the pitch value of the thread. Also the procedure would identify the total length of the bolt. In addition to the physical properties of the bolts/fasteners, the procedure would additionally provide the torque force required for assembly and any details regarding lubrication (where applicable). The torque force is either entered manually or calculated or retrieved by the instrument. Also the elongation (target) is stated and a warning (optionally presented in green/yellow/red) can be made available to the alignment engineer to inform the alignment engineer if the entered value would be structurally adequate. A clamping length is required to be included to determine the anticipated and allowable elongation of the mounting fastener.

In general the end result of the alignment job is an alignment summary report that states all relevant details to be captured. The exemplary report includes three or more different situations:

As found configuration
As specified (specifications and guidelines as stated in the structure)
As corrected configuration Energy Efficiency Indicator As previously mentioned, misalignment leads to two basic results:
Energy losses
Premature failure of components or the entire rotating machine system Both of the above mentioned results are related to each other. However the correlation varies with each machine setup and what specific components are used. For example one sort of coupling may be affected by misalignment less than a second sort of coupling. As a result, one sort of coupling may fail a little sooner than anticipated upon in the design. The second sort of coupling fails significantly sooner than anticipated.

The reliability of the rotating machinery is very much depending on the configuration of the machine setup and the installed components. The alignment and quality of the components is directly related to machine reliability, premature wear of components, and a time span before the rotating machinery could potentially fail. In other words the amount of lost energy is not 100% directed to premature wear or failure and is depending on the machine configuration and it's components. Also safety factors in the design may influence the impact that additional forces have on the machine lifecycle.

The Energy Efficiency Indicator (EEI) shows the result of the alignment in the "as found" situation and the Energy Efficiency Indicator (EEI) also shows the result of the alignment in the "as corrected" situation. In this way the user will see clearly that the Energy Efficiency has improved and consequently can assume within reasonable limits that the Risk for premature failure has been reduced. How much this really is, is not stated explicitly.

The alignment summary report also states an indication or calculated value for Energy Efficiency before and after alignment, or in the as found situation and in the as corrected situation.

The alignment between coupled shafts and the energy efficiency between coupled shafts can be correlated using an effective linear distal offset representation 216 as illustrated in FIG. 11. As illustrated in FIGS. 1 through 6, the offset of alignment between the representative first shaft rotational axis 220 and representative second shaft rotational axis 270 can be measured in several distinct offsets, including the vertical offset 212, the horizontal offset 213, the elevation angular offset 214, and the plan angular offset 215. The vertical offset 212 and the horizontal offset 213 can be combined into an effective linear distal offset 217 using pythagorean theorem. Pythagorean theorem takes the square root of the sum of each of the vertical offset 212 (squared) and horizontal offset 213 (squared).

Linear Distal Offset 217=Square Root [(Vertical Offset 212)2+(Horizontal Offset 213)2]

Pythagorean Theorem

Figure 12:
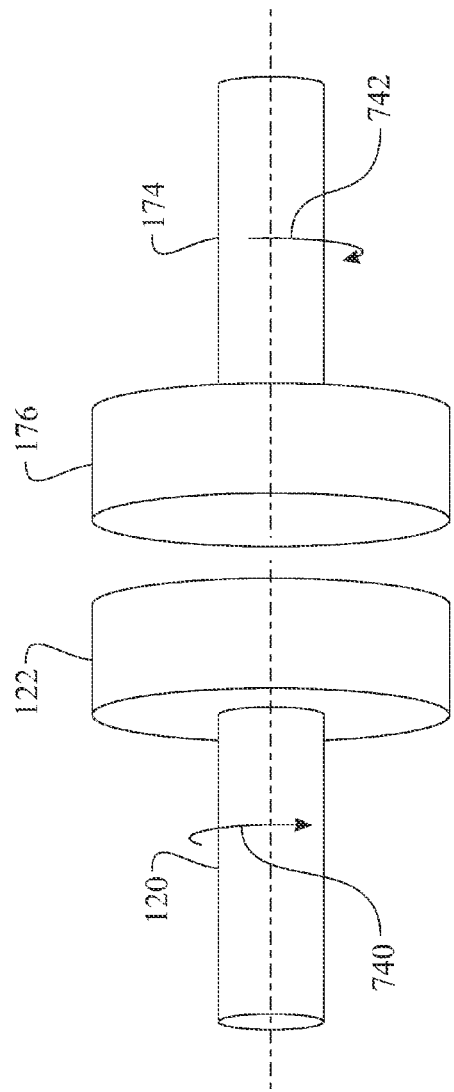
FIG. 12 presents an exemplary mating end of a pair of coupled shafts, the shafts being illustrated in acceptable alignment.
Figure 13:
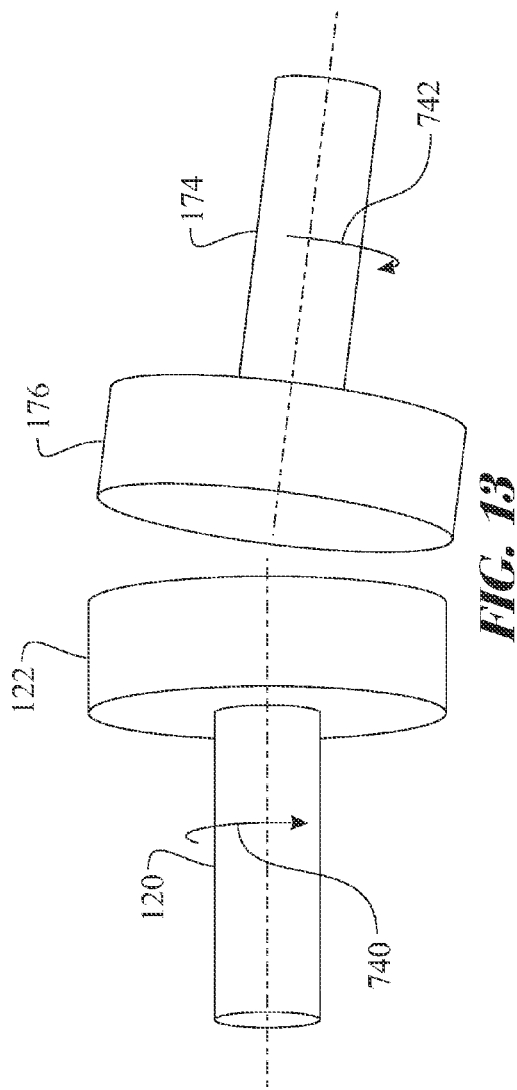
FIG. 13 presents the exemplary mating end of a pair of coupled shafts introduced in FIG. 12, the shafts being illustrated in unacceptable alignment.

The linear distal offset 217 can be correlated to energy transfer efficiency between a shaft providing power into the system, such as the first shaft portion 120 in the exemplary illustration presented in FIG. 12 and the driven shaft receiving the power from the power providing shaft 120, such as the second shaft portion 174 in the exemplary illustration presented in FIG. 12. The energy transfer efficiency can be referenced by an energy transfer efficiency percentage. The rotating machinery generates a drive torque 740 that is transferred via the first shaft portion 120 to the second shaft portion 174 through the inter-machine coupler 199 (FIGS. 1-6). The second shaft portion 174 rotates having a transferred torque 742, which includes losses due to the inter-machine coupler 199 and misalignment. The losses due to the inter-machine coupler 199 can be determined when operating the coupled machinery when optimally aligned. The transferred torque 742 is reduced when the first shaft portion 120 and second shaft portion 174 become misaligned, wherein the transferred torque 742 is referenced as a non-optimized transferred torque 744, as illustrated in FIG. 13.

Some energy that is lost due to misalignment is converted into heat and impacts some components more than others. The correlation between energy loss and premature failure is not very clear to express in one consistent formula. However, energy loss (referred to as energy efficiency) has a better correlation with misalignment.

Energy efficiency can be calculated by dividing the non-optimized transferred torque 744 by the drive torque 740.

Energy Efficiency=non-optimized transferred torque 744/drive torque 740

A misalignment value does not always tell us clearly if there was an improvement after alignment. This problem is simplified if the misalignment values are expressed into one value: Energy Efficiency Indicator.

The energy efficiency can be correlated to misalignment between the first shaft portion 120 and second shaft portion 174, or reference by the representative value being the effective linear distal offset 217. One exemplary correlation is presented as an energy efficiency indicator reference chart 700 illustrated in FIG. 11. The energy efficiency indicator reference chart 700 presents a misalignment and efficiency correlation index 730 having a first component being referenced along a misalignment axis 710 and a second component referenced along an efficiency axis 720. Identifying any two components of the energy efficiency indicator reference chart 700 enables the user to identify the third.

This can be referred to simply as an Energy Efficiency Indicator (EEI).

The Energy Efficiency Indicator (EEI) shows the result of the alignment in the "as found" situation and the Energy Efficiency Indicator (EEI) also shows the result of the alignment in the "as corrected" situation. In this way the user will see clearly that the energy efficiency has improved and consequently can assume within reasonable limits that the risk for premature failure has been reduced. The quantification of the risk, however, is not explicitly stated.

Figure 14:
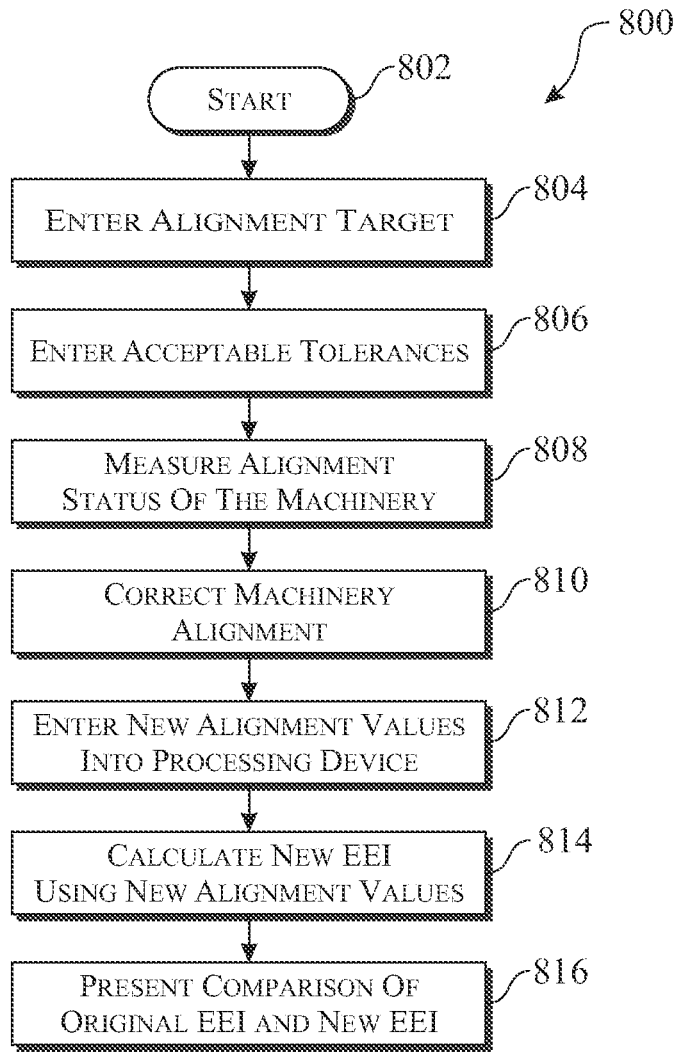
FIG. 14 presents an exemplary energy efficiency indicator comparison flow diagram.

An exemplary application of the Energy Efficiency Indicator (EEI) is outlined in an Energy Efficiency Indicator comparison process flow diagram 800 presented in FIG. 14. The process 800 initiates with a start step 802. The alignment engineer would obtain access to a processing device, such as a hand-held computer, a tablet, and the like, the processing device comprising a microprocessor, a digital data storage or memory device, a user input interface which enables the alignment engineer to enter data, a display for providing information to the alignment engineer, circuitry, an instruction set provided in the form of a program, and respective power to operate the processing device. The program can present inquiries and directions to the alignment engineer, which guides the alignment engineer through the process. This can include instructions for completing an activity, such as taking a measurement, repositioning an element, adjusting the tightness of a component or fastener, entering information, and the like.

The alignment engineer enters an alignment target into a process program in accordance with step 804. In addition to an alignment target, the Energy Efficiency Indicator (EEI) process utilizes an acceptable tolerance. The alignment engineer would enter the acceptable tolerance values into the process program, as directed in step 806. The alignment engineer continues by measuring the current alignment of the machinery and enters the current alignment values into the program in accordance with in step 808. The program processes the measured alignment values and converts the measured alignment values into an initial Energy Efficiency Indicator (EEI). The measured alignment values are initially provided in laser measurement values and converted into centroid values. The program presents the misaligned values in a format as target values. The target is considered as the reference point, where the target values equal 100%. Any deviations, even within the stated tolerances, will reduce the Energy Efficiency.

The program would utilize the target values and entered acceptable tolerances to provide the alignment engineer with information to properly align the machinery as referenced in step 810. The alignment engineer utilizes the information provided by the program to correct the physical alignment of the machinery. The alignment engineer subsequently measures the alignment of the post aligned machinery and enters the new alignment values of the machinery into the program in accordance with step 812. The program utilizes the new alignment values to determine an updated Energy Efficiency Indicator (EEI) as represented in step 814. The program can present a comparison between the initial Energy Efficiency Indicator (EEI) and the updated Energy Efficiency Indicator (EEI) to show the alignment engineer any improvement thereof.

Figure 15:
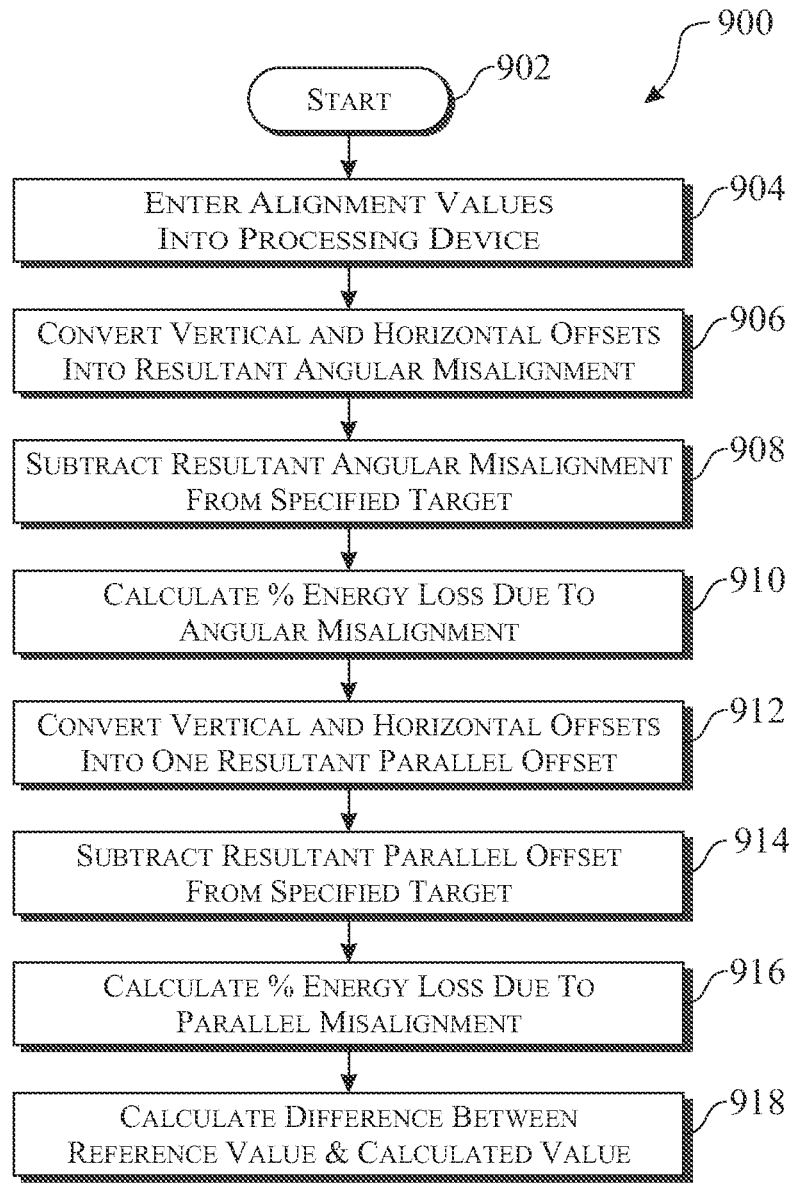
FIG. 15 presents an exemplary energy efficiency indicator calculation flow diagram.

A process of calculating the Energy Efficiency Indicator (EEI) is presented in an exemplary energy efficiency indicator calculation flow diagram presented in FIG. 15. The calculation process 900 initiates with a start step 902. The alignment engineer utilizes alignment measurement equipment, such as a laser measurement device, to obtain measurement values. The current alignment measurement values are entered into the processing device in accordance with step 904. The programming within the processing device converts the vertical offset 212 and the horizontal offset 213 into a resultant angular offset or angular misalignment. The conversion is referenced in step 906. The program continues, subtracting the resultant angular offset from a specified target angular relation as directed in step 908. The program utilizes the difference to calculate the percentage of energy loss due to the resultant angular misalignment, as noted in step 910. The energy loss can be calculated by any algorithm or formula applicable to any rotating equipment or industry standard. Similar to step 906, the program converts the vertical offset 212 and the horizontal offset 213 into a resultant parallel offset or distal misalignment. The conversion is referenced in step 912. An example of this is presented in the effective linear distal offset representation 216 illustrated in FIG. 10. The program continues, subtracting the resultant distal offset from a specified target parallel relation as directed in step 914. The program utilizes the difference to calculate the percentage of energy loss due to the resultant distal misalignment, as noted in step 916. The program calculates the difference between reference value (target) and the as found calculated percentage (%) value. This will be the Energy Efficiency Indicator for the found values.

The Energy Efficiency Indicator (EEI) can be used to predict energy efficiency when a misalignment is known. Similarly, the Energy Efficiency Indicator (EEI) can be used to predict misalignment when the energy efficiency is known. The Energy Efficiency Indicator (EEI) can be provided in an index, a mathematical formula or algorithm, a chart (such as the misalignment and efficiency correlation index 730 in the Energy Efficiency At Transmission Point chart illustrated in FIG. 11), and the like. One example would be to monitor the drive torque 740 and the transferred torque 742 to determine if the alignment is acceptable or in need to adjustment. Constant or cyclical monitoring of the misalignment and efficiency correlation index 730 can inform the operator of an unacceptable alignment condition, where the operator can proactively correct the alignment. This would reduce overall down time; wear on components; and the like, while extending the life span of the coupled rotating machinery.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

REF. NO. DESCRIPTION 100 mounted first rotating machine assembly
110 first rotating machine
112 rotating machine base
114 first mounting foot
116 second mounting foot
118 threaded mounting fastener
119 alignment shim
120 first shaft portion
122 first shaft portion coupling end
124 second shaft portion
126 second shaft portion coupling end
150 mounted second rotating machine assembly
160 second rotating machine
162 rotating machine base
164 first mounting foot
166 second mounting foot
170 first shaft portion
172 first shaft portion coupling end
174 second shaft portion
176 second shaft portion coupling end
199 intermachine coupler
210 elevation target alignment
211 plan target alignment
212 vertical offset
213 horizontal offset
214 elevation angular offset
215 plan angular offset
216 effective linear distal offset representation
217 effective linear distal offset
218 effective angular offset
220 representative first shaft rotational axis
222 representative first shaft coupling end
226 representative first shaft available end
230 vertical adjustment
232 elevation angular adjustment
234 horizontal adjustment
236 plan angular adjustment
270 representative second shaft rotational axis
272 representative second shaft coupling end
276 representative second shaft available end
400 rotating machinery predictive alignment process
600 preparation process flow
700 energy efficiency indicator reference chart
710 misalignment axis
720 efficiency axis
730 misalignment and efficiency correlation index
740 drive torque
742 transferred torque
744 non-optimized transferred torque

What is claimed is:

1. A method implemented by a computing device for determining an energy efficiency indicator respective to a coupling provided between adjacent rotating machines, the computing device comprising a microprocessor, a digital data storage device, a user input interface configured to receive data, a display configured to provide information, circuitry configured to provide operable interconnectivity between components of the computing device, comprising determining a first offset between a pair of coupled shafts of the adjacent rotating machines by automatically detecting and monitoring a first initial torque of a first mounting hardware of a first shaft of the pair of coupled shafts and automatically detecting and monitoring a second initial torque of a second mounting hardware of a second shaft of the pair of coupled shafts, the first offset being in an as found condition;

providing an alignment, as the information, between the pair of coupled shafts causing the pair of coupled shafts to be placed into a correct condition;

in response to the providing of the alignment, determining a second offset between the pair of coupled shafts by automatically detecting and monitoring a first subsequent torque of the first mounting hardware of a first shaft of the pair of coupled shafts and automatically detecting and monitoring a second subsequent torque of the second mounting hardware of a second shaft of the pair of coupled shafts, the second offset being in the corrected condition; and determining the energy efficiency indicator by determining a percentage difference between the second offset in the corrected condition and the first offset in the as found condition.

2. A method of determining an energy efficiency indicator as recited in claim 1, wherein the each of the first and second offsets is an effective linear distal offset.

3. A method of determining an energy efficiency indicator as recited in claim 2, the determining of the effective linear distal offset comprising:

determining a vertical offset;
determining a horizontal offset;
utilizing the vertical offset and the horizontal offset to calculate the effective linear distal offset.

4. A method of determining an energy efficiency indicator as recited in claim 1, wherein the determining each of the first and second offset between the pair of coupled shafts comprises determining an effective angular offset.

5. A method of determining an energy efficiency indicator as recited in claim 4, the determining of the effective angular offset comprising:

determining an elevation angular offset;
determining a plan angular offset;
utilizing the elevation angular offset and the plan angular offset to calculate an effective linear distal offset,
wherein the each of the first and second offsets is the effective linear distal offset.

6. A method of determining an energy efficiency indicator as recited in claim 1, wherein the first initial torque is an initial, as found condition drive torque;

wherein the second initial torque is an initial, as found condition transferred torque;
wherein the first subsequent torque is a post alignment condition drive torque;
wherein the second subsequent torque is a post alignment condition transferred torque;
wherein the method comprising:
determining an energy efficiency by dividing the initial, as found condition transferred torque by the initial, as found condition drive torque.

7. A method of determining an energy efficiency indicator as recited in claim 6, comprising:
  determining a current alignment of the pair of coupled shafts based on the energy efficiency and the energy efficiency indicator.

8. A method of determining an energy efficiency indicator as recited in claim 7, comprising:
  determining if the current alignment is within a predetermined allowable tolerance from an optimal operational alignment.

9. A computer program product, the computer program product comprising a non-transitory computer readable storage medium having program instructions for determining an energy efficiency indicator respective to a coupling provided between adjacent rotating machines embodied therewith, the program instructions executable by a processor to cause the processor to perform:
  determining a first offset between a pair of coupled shafts of the adjacent rotating machines by automatically detecting and monitoring a first initial torque of a first mounting hardware of a first shaft of the pair of coupled shafts and automatically detecting and monitoring a second initial torque of a second mounting hardware of a second shaft of the pair of coupled shafts, the first offset being in an as found condition
  providing an alignment, as information via a display, between the pair of coupled shafts causing the pair of coupled shafts to be placed into a correct condition;
  in response to the providing of the alignment, determining a second offset between the pair of coupled shafts by automatically detecting and monitoring a first subsequent torque of the first mounting hardware of a first shaft of the pair of coupled shafts and automatically detecting and monitoring a second subsequent torque of the second mounting hardware of a second shaft of the pair of coupled shafts, the second offset being in the corrected condition; and
  determining the energy efficiency indicator by determining a percentage difference between the second offset in the corrected condition and the first offset in the as found condition.

10. A computer program product as recited in claim 9, wherein the each of the first and second offsets is an effective linear distal offset.

11. A computer program product as recited in claim 10, wherein the program instructions, with respect to the determining of the effective linear distal offset, comprising:
  determining a vertical offset;
  determining a horizontal offset;
  utilizing the vertical offset and the horizontal offset to calculate the effective linear distal offset.

12. A computer program product as recited in claim 9, wherein the program instructions, with respect to the determining each of the first and second offset between the pair of coupled shafts, comprising:
  determining an effective angular offset.

13. A computer program product as recited in claim 12, wherein the program instructions, with respect to the determining of the effective angular offset, comprising:
  determining an elevation angular offset;
  determining a plan angular offset;
  utilizing the elevation angular offset and the plan angular offset to calculate an effective linear distal offset, wherein the each of the first and second offsets is the effective linear distal offset.

14. A computer program product as recited in claim 9, wherein the first initial torque is an initial, as found condition drive torque;
  wherein the second initial torque is an initial, as found condition transferred torque;
  wherein the first subsequent torque is a post alignment condition drive torque;
  wherein the second subsequent torque is a post alignment condition transferred torque;
  wherein the program instruction comprising:
    determining an energy efficiency by dividing the initial, as found condition transferred torque by the initial, as found condition drive torque.

15. A computer program product as recited in claim 9, wherein the program instructions comprising:
  determining a current alignment of the pair of coupled shafts based on the energy efficiency and the energy efficiency indicator.

16. A computer program product as recited in claim 9, wherein the program instructions comprising:
  determining if the current alignment is within a predetermined allowable tolerance from an optimal operational alignment.

17. A system, comprising a processor and a memory storing program instructions for determining an energy efficiency indicator respective to a coupling provided between adjacent rotating machines thereon, the program instructions executable by a processor to cause the system to perform:
  determining a first offset between a pair of coupled shafts of ad the adjacent rotating machines by automatically detecting and monitoring a first initial torque of a first mounting hardware of a first shaft of the pair of coupled shafts and automatically detecting and monitoring a second initial torque of a second mounting hardware of a second shaft of the pair of coupled shafts, the first offset being in an as found condition
  providing an alignment, as information via a display of the system, between the pair of coupled shafts causing the pair of coupled shafts to be placed into a correct condition;
  in response to the providing of the alignment, determining a second offset between the pair of coupled shafts by automatically detecting and monitoring a first subsequent torque of the first mounting hardware of a first shaft of the pair of coupled shafts and automatically detecting and monitoring a second subsequent torque of the second mounting hardware of a second shaft of the pair of coupled shafts, the second offset being in the corrected condition; and
  determining the energy efficiency indicator by determining a percentage difference between the second offset in the corrected condition and the first offset in the as found condition.

18. A system as recited in claim 17, wherein the each of the first and second offsets is an effective linear distal offset.

19. A system as recited in claim 18, wherein the program instructions, with respect to the determining of the effective linear distal offset, comprising:
  determining a vertical offset;
  determining a horizontal offset;
  utilizing the vertical offset and the horizontal offset to calculate the effective linear distal offset.

* * * * *